United States Patent
Dube et al.

(10) Patent No.: US 7,066,713 B2
(45) Date of Patent: *Jun. 27, 2006

(54) ROTOR BLADE FOR A ROTARY MACHINE

(75) Inventors: Bryan P. Dube, Columbia, CT (US); Eric D. Gray, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 103 days.

This patent is subject to a terminal disclaimer.

(21) Appl. No.: 10/770,323

(22) Filed: Jan. 31, 2004

(65) Prior Publication Data

US 2005/0169758 A1    Aug. 4, 2005

(51) Int. Cl.
*F01D 11/08*    (2006.01)
(52) U.S. Cl. .................. 415/173.5; 416/190; 416/191; 416/192
(58) Field of Classification Search .............. 416/190, 416/191, 192; 415/173.4, 173.5
See application file for complete search history.

(56) References Cited

U.S. PATENT DOCUMENTS

| | | | |
|---|---|---|---|
| 6,241,471 B1 * | 6/2001 | Herron | 416/191 |
| 6,402,474 B1 | 6/2002 | Okuno | |
| 6,491,498 B1 | 12/2002 | Seleski et al. | |
| 6,499,950 B1 | 12/2002 | Willett et al. | |
| 6,805,530 B1 * | 10/2004 | Urban | 415/173.4 |
| 6,857,853 B1 * | 2/2005 | Tomberg et al. | 416/192 |
| 6,890,150 B1 * | 5/2005 | Tomberg | 415/173.4 |
| 6,913,445 B1 * | 7/2005 | Beddard et al. | 416/192 |

FOREIGN PATENT DOCUMENTS

JP        3150526 B2    9/1995

* cited by examiner

*Primary Examiner*—Christopher Verdier
(74) *Attorney, Agent, or Firm*—Gene D. Fleischhauer

(57) ABSTRACT

A rotor blade having a wing and beam construction for a tip shroud is disclosed. Various construction details are developed for providing a transition zone that extends from the suction side and pressure side of the airfoil to provide a flow path surface of the shroud. In one detailed embodiment, the transition zone is contoured under the beam differently than a portion under the rear portions of the wings.

16 Claims, 7 Drawing Sheets

| | b | a | a/b | a/b (ROUNDED TO 2ND DECIMAL) | b/a (ref) |
|---|---|---|---|---|---|
| 1 | 0.512679 | 0.737275 | 1.438083 | 1.44 | 0.69537 |
| 2 | 0.480116 | 0.618696 | 1.288639 | 1.29 | 0.776012 |
| 3 | 0.446316 | 0.525472 | 1.177355 | 1.18 | 0.849361 |
| 4 | 0.394038 | 0.391043 | 0.992398 | 0.99 | 1.00766 |
| 5 | 0.389149 | 0.388756 | 0.998989 | 1.00 | 1.001012 |
| 6 | 0.354482 | 0.354113 | 0.998958 | 1.00 | 1.001043 |
| 7 | 0.453442 | 0.466271 | 1.028293 | 1.03 | 0.972486 |
| 8 | 0.662323 | 0.745548 | 1.125656 | 1.13 | 0.888371 |
| 9 | 0.653174 | 0.73518 | 1.12555 | 1.13 | 0.888455 |
| 10 | 0.595923 | 0.656509 | 1.101668 | 1.10 | 0.907714 |
| 11 | 0.233095 | 0.260977 | 1.119613 | 1.12 | 0.893166 |
| 12 | 0.123938 | 0.108923 | 0.878853 | 0.88 | 1.137847 |
| 13 | 0.291288 | 0.401501 | 1.378366 | 1.38 | 0.725497 |

ROTOR BLADE FOR A ROTARY MACHINE

This application claims benefit under 35 USC 120 from: U.S. application Ser. No. 10/770,322 filed Jan. 31, 2004 by Dube et al. entitled "Rotor Blade for a Rotary Machine;" and U.S. application Ser. No. 10/770,331 filed Jan. 31, 2004 by Dube et al. entitled "Rotor Blade for a Rotary Machine."

CROSS-REFERENCE TO RELATED APPLICATIONS

The subject matter of this application is related to the subject matter of: U.S. application Ser. No. 10/770,322 filed Jan. 31, 2004 by Dube et al. entitled "Rotor Blade for a Rotary Machine;" and U.S. application Ser. No. 10/770,331 filed Jan. 31, 2004 by Dube et al. entitled "Rotor Blade for a Rotary Machine."

BACKGROUND OF THE INVENTION

This invention relates to rotor blades of the type used in industrial gas turbine engines, and more specifically, to the tip region of such a rotor blade.

Gas turbine engines for aircraft have rotor blades that typically are smaller than rotor blades used in, for example, the turbine of an industrial gas turbine that employs steam as a working medium.

The rotor assembly employs such blades with a rotating structure, such as a rotor disk, having an axis of rotation and a plurality of outwardly extending blades. Each blade is disposed about a spanwise axis that extends radially. Generally, the spanwise axis is a radial line referred to as the stacking line which extends outwardly on a radius from the axis of the rotor blade. The rotor blade has a base, commonly called a root, which engages the rotating structure at the inner end of the blade.

The rotor blades each have an airfoil which extends outwardly from the root across the working medium flowpath. The rotor blade typically has a shroud extending between airfoils of adjacent rotor blades at the tip region of the rotor blade. The shroud has cantilevered wings which extend laterally (circumferentially) between adjacent rotor blades. The wings include a portion of a transition zone that extends from the junction with the airfoil and that has an inwardly facing surface which bounds the working medium flowpath. The shroud also has a seal land which extends circumferentially in close proximity to adjacent stator structure to block the working medium gases from leaving the flowpath. In some constructions, a more rigid member extends between the front and rear portions of the wings to carry the seal land and provide a portion of the transition zone.

The shrouds of adjacent rotor blades abut at contact areas on the laterally facing sides of the shroud. The abutting shrouds reduce blade deflections about the spanwise axis and minimize vibration of the rotor blades. Damping of the blades takes place through rubbing of the contact faces of adjacent shrouds. Additional rotational loads are created by the mass of the shroud as compared with rotor blades having no shrouds. These rotational loads increase stresses at the shroud airfoil interface because of the sudden change in cross-section of the material; and, increase stresses at the root-disk interface of the rotor blade and the disk. The stresses in the airfoil and the shroud of the rotor blades require heavier designs than non-shrouded blades of equivalent cyclic fatigue life. In addition, the mass of the shroud may cause creep of the airfoil and creep of portions of the shroud in a radial direction because of rotational forces generated under operative conditions.

Accordingly, scientists and engineers working on the direction of applicants assignee have sought to develop shrouds for rotor blades that reduce the concentrated stresses in the rotor blades and demonstrate acceptable resistance to creep without causing additional creep in the airfoil by increasing the mass of the rotor blade.

BRIEF SUMMARY OF THE INVENTION

A tip shroud for a rotor blade shroud attached to an airfoil by a transition zone includes wings extending from the sides of the airfoil and a beam which extends past the airfoil for carrying a seal land and between the wings to divide each wing into a front portion and a rear portion, The surface contour of a transition zone for a rotor blade shroud at a particular location is defined by the line of intersection of a reference plane P with the surface of the transition zone. The reference plane is referred to as the normal sectioning plane. The reference plane passes through the point at the junction of the transition zone and the airfoil. The junction point is usually the point of tangency of the transition zone with the airfoil. The reference plane P contains a first line perpendicular to the airfoil surface (airfoil section surface) at the junction point and a second line parallel to the stacking line of the airfoil.

Accordingly, the normal sectioning plane P passes through the junction point and is defined by two straight lines passing through the junction point. As shown, for example, this provides an "X axis" which is a first straight line in the plane of the airfoil section normal (perpendicular) to the surface of the airfoil section; and, a "Y-axis," which is perpendicular to the first straight line and also parallel to the stacking line of the airfoil.

The line of intersection of the normal sectioning plane with the transition zone is referred to as a transition line. As will be realized, lines of intersection between a plane and a surface may be straight or curved depending on the orientation of the plane to the surface. Accordingly, the term "transition line" includes straight lines and curved lines. In this application, the line of intersection is viewed perpendicular to the sectioning plane. The definition of the "offset ratio" for a transition line is the ratio of the length or distance "A" of the projection of the transition line along the X-axis of the sectioning plane divided by the length or distance "B" of the projection of the transition line along the spanwise Y-axis. The length A is also referred to as the offset distance of the transition line (or transition zone) from the airfoil and the length B is referred to as the offset distance of the transition line from the shroud.

Bending or the bend of the transition line is a measure of the change in slope per unit length of the transition line as the transition line extends away from the airfoil surface. Thus, at any location, the transition line (transition zone) has a first end at the junction point with the airfoil and a second end at the location on the shroud where the remainder of the shroud extends in cantilevered fashion from the transition zone. This location is where the associated transition line smoothly joins the remainder of the shroud and the instantaneous change in slope is zero, such as at a point of tangency, or where the extension of the transition line on the shroud reverses curvature and bends outwardly.

This invention is in part predicated on the recognition that a tip shroud for a rotor blade that uses a beam extending laterally past the airfoil for carrying a seal land and supporting a portion of the shroud wings against rotational loads acting on the wings permits contouring the transition zone of the shroud that extends to the airfoil to take advantage of the shifting of part of the loads to the beam by reducing stresses at critical locations while avoiding unacceptably complicating the inspection process of the rotor blade.

According to the present invention, a tip shroud having a wing and beam construction further includes a transition zone that extends from the suction side and pressure side of the airfoil to provide a flow path surface of the shroud, the transition zone having transition lines smoothly recessed from a straight line connecting the ends of the transition line, with those transition lines on at least one side of the airfoil extending under the beam bending more away from the airfoil at a region closer to the airfoil than at a region closer to the side of the shroud such that the average of offset ratios Rb of transition lines that extend under the beam are greater than one and are greater than the average of offset ratios Rw of transition lines that extend only under the rear portion of the wings.

In accordance with one embodiment, the offset ratios Rb of transition lines under the beam are greater than the offset ratios Rw of transition lines extending only under the rear portion of the wings.

In accordance with the present invention, the transition lines extending under the beam appear to be formed by part of a conical section but have multiple radii of curvature.

In accordance with the present invention, the transition lines extending under the beam have a first radius of curvature adjacent the airfoil and a second radius of curvature adjacent the shroud that is larger than the first radius of curvature.

In accordance with one detailed embodiment, the first and second radii of curvature intersect at a point of tangency.

In accordance with another detailed embodiment, the intersection includes a straight line that is tangent to the first and second radii of curvature.

In accordance with another detailed embodiment of the present invention, the intersection includes a curved line that is tangent to the first and second radii of curvature.

In accordance with one embodiment of the present invention, the transition zone smoothly changes in the chordwise direction to a location forward or rearward of the beam at which the surface of the transition zone (transition line) has a single radius of curvature such that the offset ratio of the transition zone is one (R=1) and the offset distance A of the transition line measured with respect to the shroud is equal to the offset distance B of the transition zone measured with respect to the airfoil.

In accordance with one detailed embodiment, the projected offset distances of the transition line in portions of the transition zone forward or rearward of the beam are smaller than the distances measured at a location under the beam.

A primary advantage of the present invention is the creep resistance of the shroud to rotational loads under operative conditions which results from providing an offset ratio for transition lines underneath the beam which is greater than one, such as a curve of or an approximation of a curve of a portion of a conical section, to reduce the stress concentration factor at the transition zone and the associated concentrated stress and to provide smaller offset ratios to the wings at locations experiencing lower forces acting on the transition zone.

Another advantage of one embodiment of the present invention is the ease of manufacture which results from using a transition zone having transition lines that have a single radius of curvature in selected locations that are not under the beam to promote the inspectability of the rotor blade.

Still another advantage of one embodiment of the present invention is the creep resistance of the shroud coupled with the ease of manufacture which results from providing a transition zone having an offset ratio greater than one with a profile of the transition lines but having a compound radius of curvature (two or more radii of curvature) for ease of inspectability.

The foregoing features and advantages of the present invention will become more apparent in light of the following detailed description of the invention and the accompanying drawings.

DETAILED DESCRIPTION OF THE INVENTION

Figure 1:
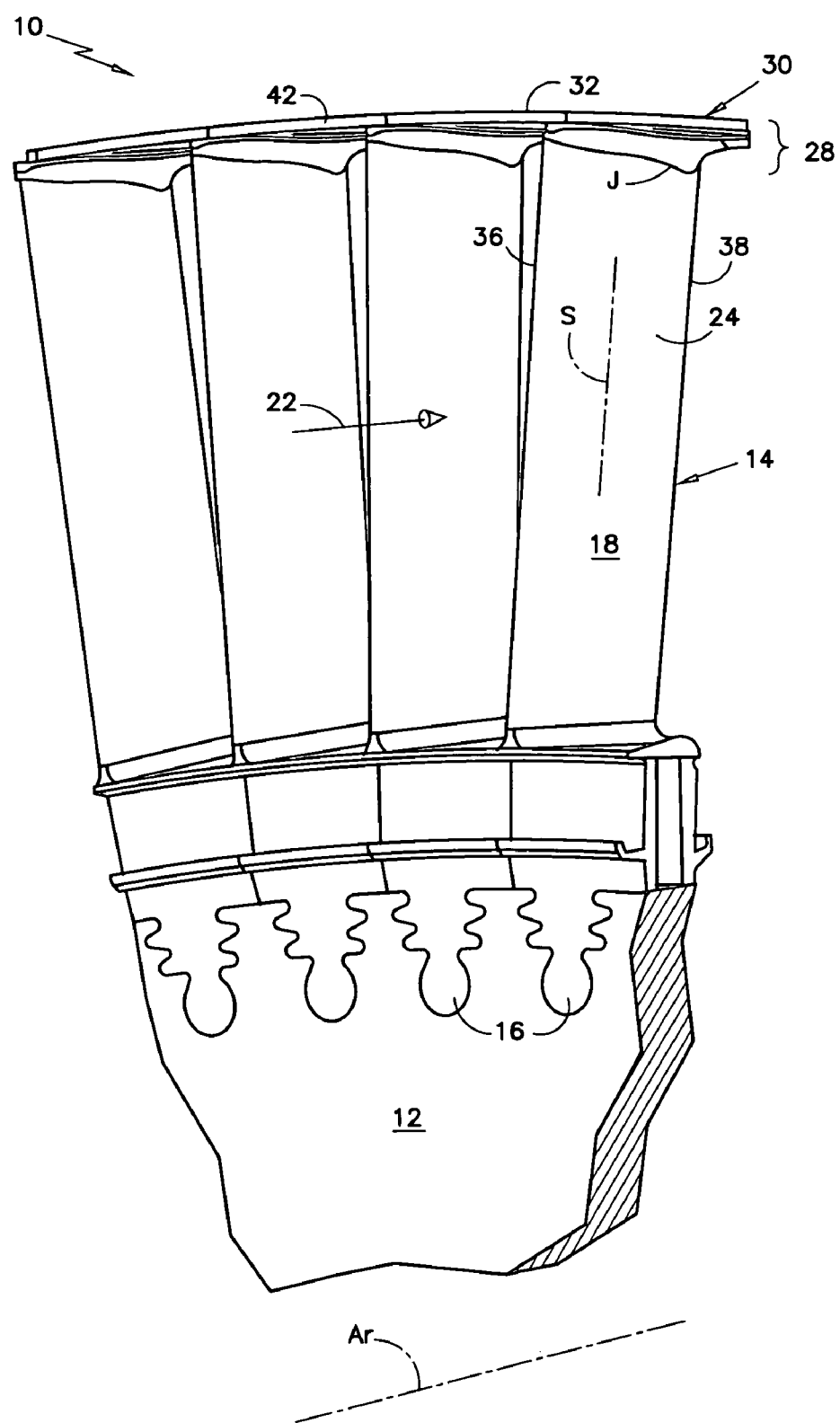
FIG. 1 is a front view of a rotor assembly.
Figure 3:
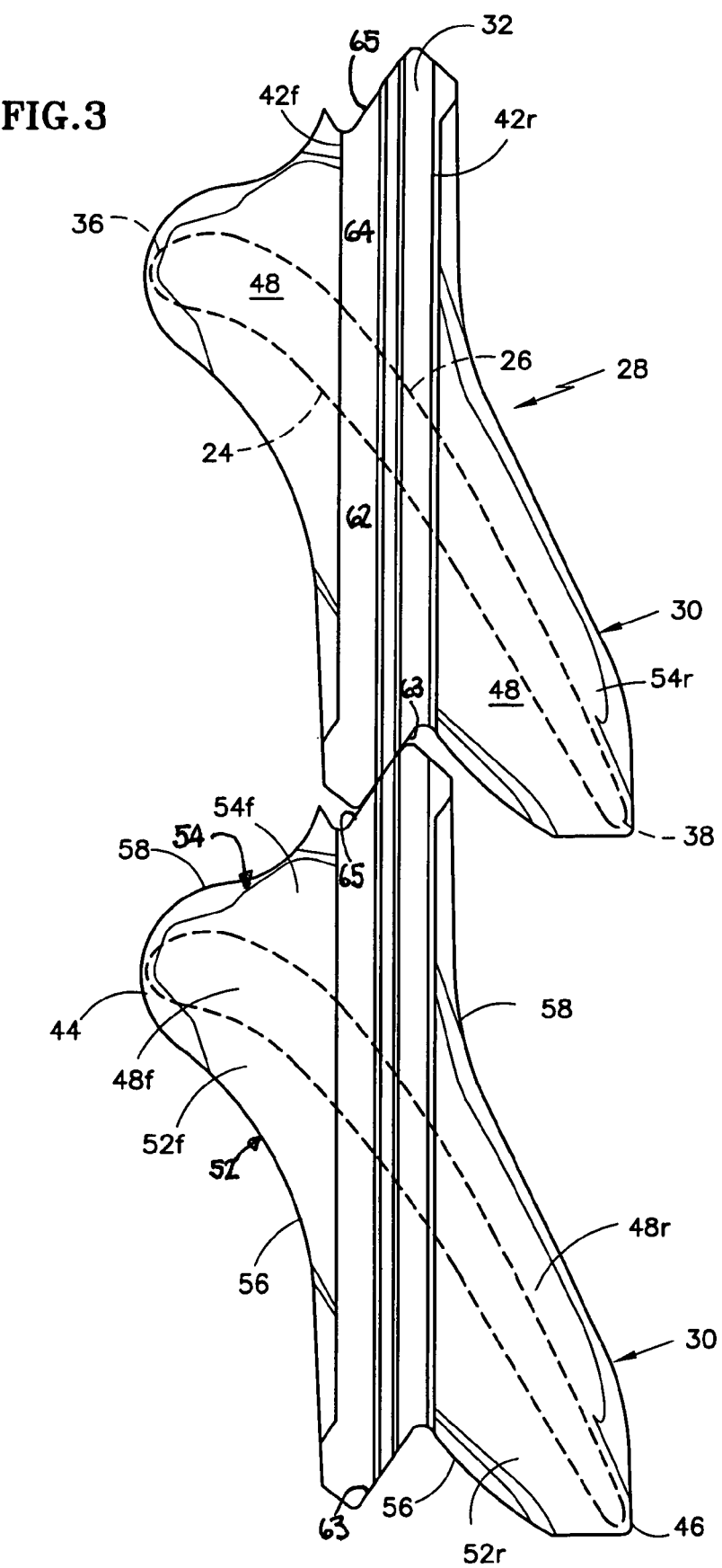
FIG. 3 is a top view of two adjacent tip shrouds of the rotor assembly shown in FIG. 1.

FIG. 1 is a simplified front elevation view of a rotor assembly 10 of a rotary machine having an axis Ar. The rotor assembly includes a rotating structure, as represented by the disk 12, and a plurality of outwardly extending rotor blades 14. Each rotor blade has a root 16 and an airfoil 18 being disposed about a spanwisely extending axis S, which is commonly called the stacking line S. The airfoil has a pressure side 24 and a suction side 26 as shown in FIG. 3. A flowpath 22 for working medium gases extends through the rotor blades between the sides of the airfoil.

Figure 6:
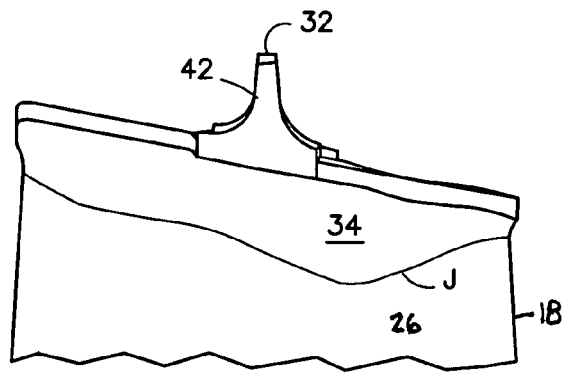
FIG. 6 is a side elevation view of the suction side of the rotor blade in the tip region.

The rotor blade has a tip region 28 having a tip shroud 30. The tip shroud includes a seal land 32 which is an outwardly facing surface having a radius of curvature about the axis Ar. As shown in FIG. 5 and FIG. 6, the tip shroud has a transition zone 34. The transition zone extends from the sides 24, 26 of the airfoil, as represented by the pressure side 24 shown in FIG. 1, FIG. 4, and FIG. 5; and, the suction side 26 shown in FIG. 4 and FIG. 6. The transition zone includes part of a flowpath surface which extends from a tangent to the pressure side and suction side of the airfoil along a junction J.

Figure 2:
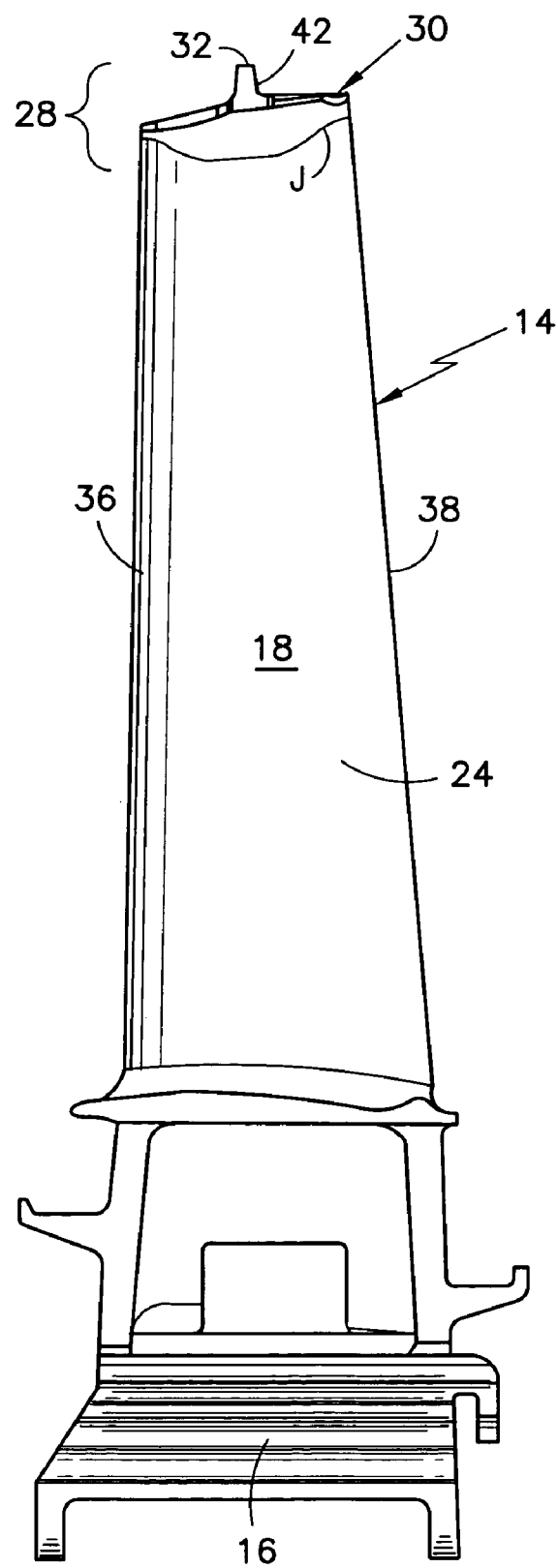
FIG. 2 is a side elevation view of the pressure side of a rotor blade.

FIG. 2 is a side elevation view of the rotor blade shown in FIG. 1. As shown in FIG. 1 and FIG. 2, the airfoil 18 has a leading edge 36 and a trailing edge 38. The tip shroud has a laterally (circumferentially) extending beam 42 which carries the seal land 32.

FIG. 3 is a top view of a pair of adjacent tip shrouds 30. Each tip shroud has a leading edge region 44 and a trailing edge region 46. The tip shroud includes a depression 48 in the shroud generally radially outwardly of the airfoil and generally following the curve in the tip region of the pressure and suction sides of the airfoil from the leading edge region to the trailing edge region.

The tip shroud includes a pressure side wing 52 extending from the pressure side of the airfoil having a front portion 52$f$ and a rear portion 52$r$. The portions of the wing continue the surface of the depression. The pressure side wing has a laterally facing pressure side 56. The tip shroud includes a suction side wing 54 extending from the suction side of the airfoil having a front portion 54$f$ and a rear portion 54$r$. The portions of the wing continue the surface of the depression. The suction side wing 54 has a laterally facing suction side 58.

The tip shroud further has the beam 42 which has a front face 42$f$ and a rear face 42$r$ integral with the wings. The beam extends laterally between the wings to divide each wing 52, 54 into the front portion 52$f$, 54$f$ and the rear portion 52$r$, 54$r$ and laterally across the depression to divide the depression into a front portion 48$f$ and a rear portion 48$r$. The beam further has a pressure side region 62 extending laterally past the pressure side of the airfoil in the tip region of the airfoil, and has a laterally facing pressure side 63 which adapts the beam to engage the suction side 65 of the beam of the adjacent airfoil. The beam also has a similar region on the suction side. The suction side region 64 extends laterally past the suction side of the airfoil in the tip region of the airfoil, and has the laterally facing suction side 65 which adapts the suction side of the beam to engage the pressure side of the beam of the adjacent airfoil.

Figure 4:
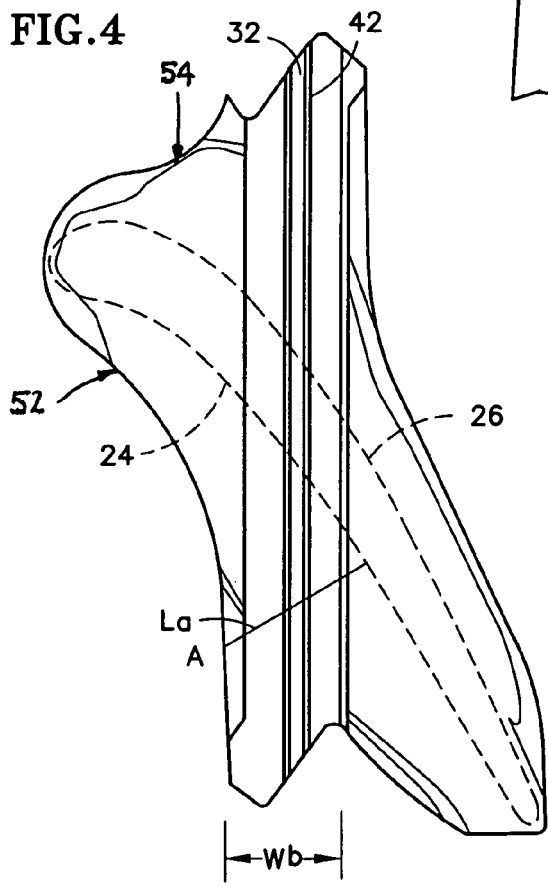
FIG. 4 is a top view of the tip shroud shown in FIG. 3.
Figure 5:
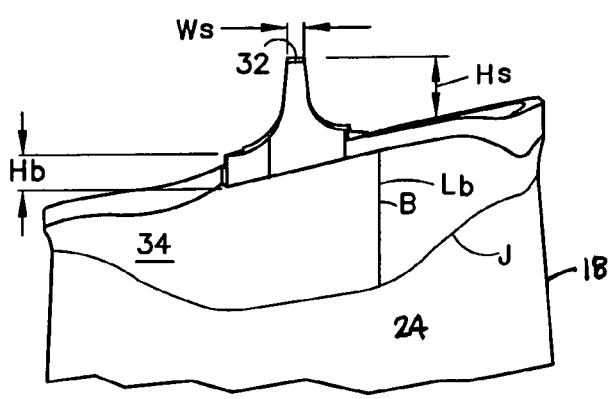
FIG. 5 is a side elevation view of the pressure side of the rotor blade in the tip region.

FIG. 4 is a top view of the rotor blade shown in FIG. 3. FIG. 5 and FIG. 6 are side elevation views, respectively, of the pressure side 24 and suction side 26 of the airfoil 18 of the rotor blade shown in FIG. 4. As mentioned, the seal land 32 extends radially outwardly from the beam 42. The seal land reinforces the beam. The combination of the seal land 32 and beam 42 extends to support the front and rear portions of the wings 52, 54 providing a portion of the support required against rotational forces acting on the wings under operative conditions. Toward this end, the beam and seal land have an inverted T-shaped cross-sectional shape. The axial width Wb of the beam is greater than four times the axial width Ws of the seal land and the radial height Hs of the seal land is greater than twice the height of the beam Hb. A fillet radius extends from the front face of the seal land to the front face of the beam and a fillet radius extends from the rear face of the seal land to the rear face of the beam.

As discussed earlier, FIG. 5 and FIG. 6 also show the junction J of the transition zone with the pressure side 24 and suction side 26 of the airfoil. The junction is formed by an infinite number of junction points each at the point of tangency of the transition zone 34 to the airfoil. The tangency of the line provides a smooth transition. As will be realized, other types of smooth transitions may exist although a tangent is preferred because of the smooth change that occurs. A normal sectioning plane P is shown. The normal sectioning plane has a first line La perpendicular to the side of the airfoil at the point of tangency (junction point) and a second line Lb passing through the junction point and parallel to the stacking line S as discussed earlier.

The offset distances A and B are shown. As can be seen from the junction J, the transition zone extends much further down on the pressure side of the airfoil than on the suction side of the airfoil.

Figures 7, 7A:
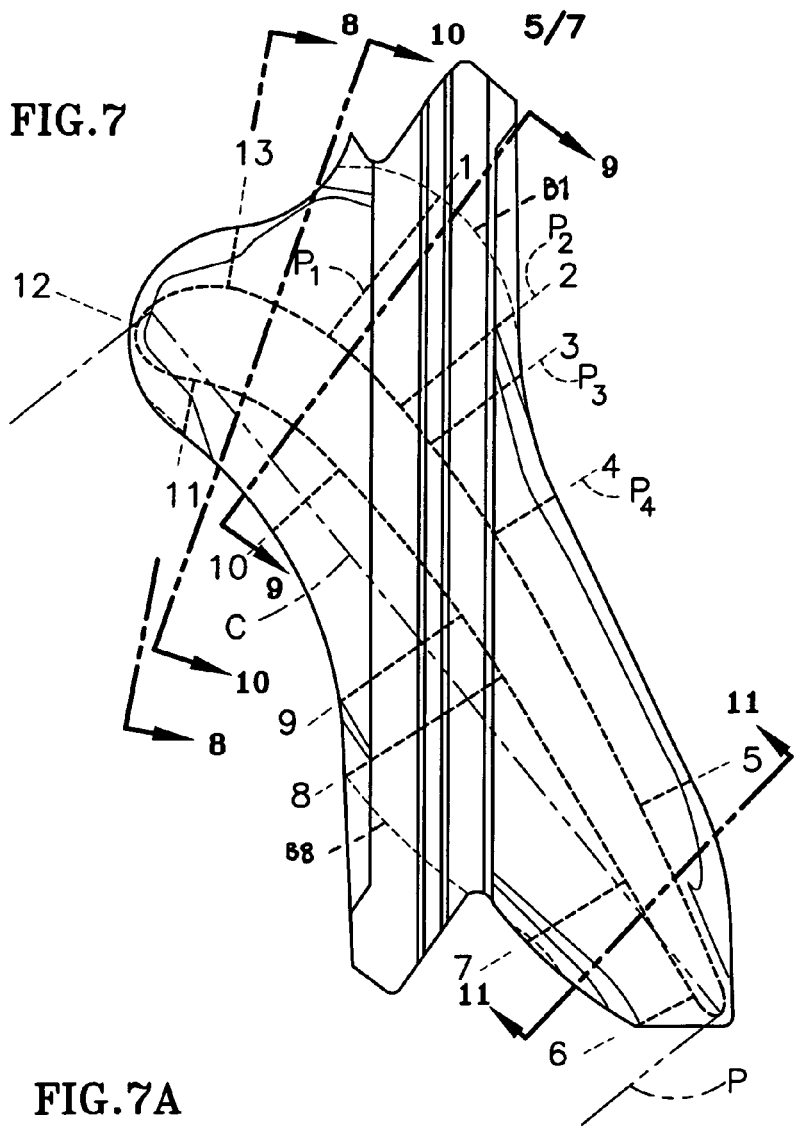
FIG. 7 is a top view of the shroud showing the location of a normal sectioning plane at thirteen locations on the tip shroud and showing the extent of the transition zone extending on the shroud and as reported in Table 1 (FIG. 7A).

FIG. 7 is a view from above of one representative airfoil section. The surface of the airfoil is defined by a plurality of these airfoil sections each extending perpendicular to the stacking line S. FIG. 7 shows the relationship of the leading edge and the trailing edge to a chord line having a length C which connects the leading edge in the trailing edge. A mean chord line extends from the leading edge to the trailing edge about midway between the suction side and the pressure side. The leading edge region 44 extends about three percent of the length of the chord line along a line tangent to the mean chord line at the leading edge. The trailing edge region 46 extends about three percent of the length of the chord line along a line tangent to the mean chord line at the trailing edge, FIG. 7 also shows thirteen normal sectioning planes intersecting the transition zone, each having a line of intersection with the surface of the transition zone. The length of the offset distances A are shown. Each sectioning plane shows that the transition zone extends to the side of the wings and under the beam to the extent shown by the curved lines near plane 1 (B1) and plane 8 (B8).

Table 1 (FIG. 7A) is a listing of the offset distances A, B, as shown for example in FIG. 4 and FIG. 5, and the offset ratio R=A/B. The offset ratio is also shown rounded to the nearest hundredths. As can be seen from inspection of the Table, the offset ratio is fairly large and greater than one (A/B>1) on the front portion of the suction side wing and under the beam on the suction side. The ratios underneath the beam on the pressure side are smaller but are also greater than one (A/B>1). This is attributable in part to the contouring of the transition zone which has more material extending radially down the side of the airfoil on the pressure side, that is, the offset B of the transition line, than on the suction side as shown in FIG. 5 and FIG. 6.

Figure 8:
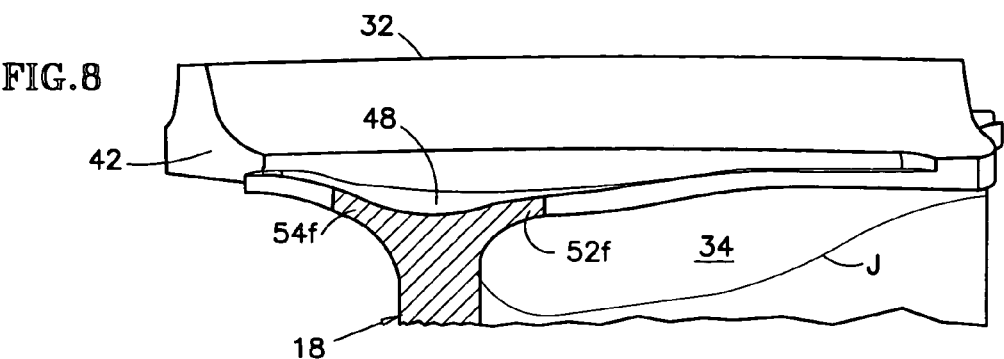
FIG. 8, FIG. 9 and FIG. 10 are front, oblique, cross-sectional schematic perspective views of the tip shroud shown in FIG. 2.
Figure 9:
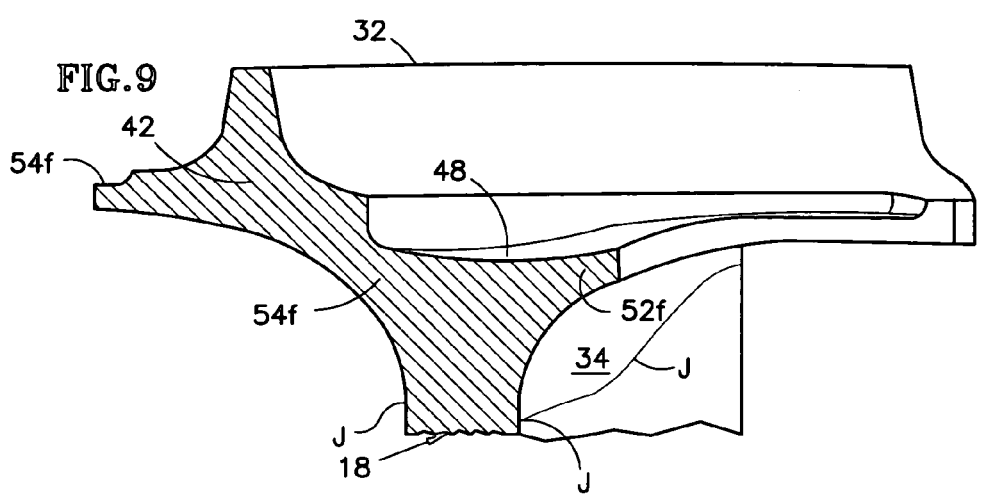
Figure 10:
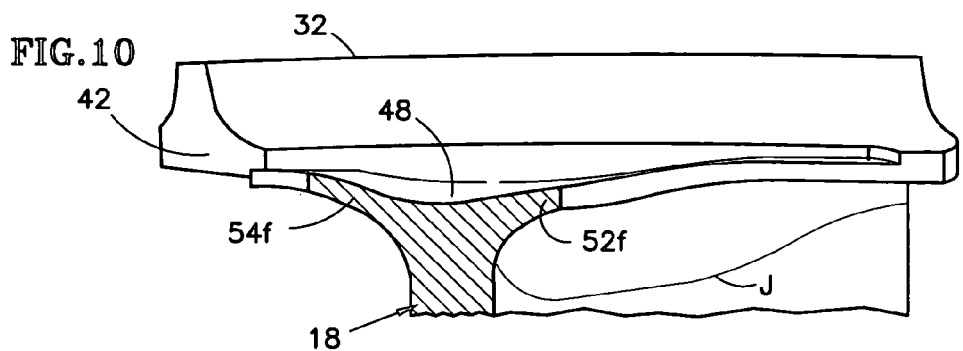
Figure 11:
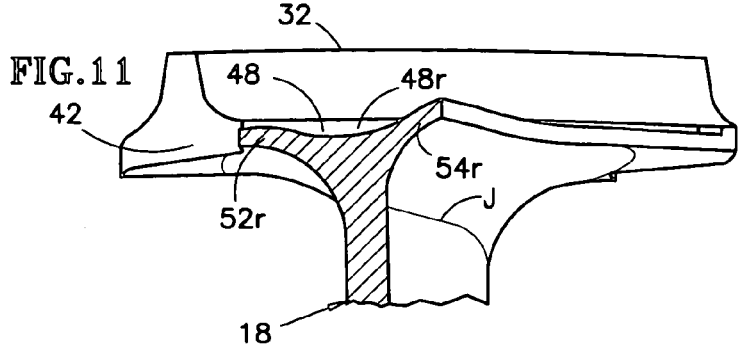
FIG. 11 is a rear, oblique, cross-sectional schematic perspective view of the tip shroud shown in FIG. 2.

Examples of the relationship of the offset ratios of the transition line are shown in the following FIGS. 8–11 which are cross-sectional views taken in FIG. 7 respectively along the lines 8—8, lines 9—9, lines 10—10, and lines 11—11. For example, FIG. 8 is a simplified cross-sectional perspective view from the front showing a circular transition line on the pressure side of the airfoil. The normal sectioning plane P passes through the junction point J. The view is not taken parallel to the normal sectioning plane. FIG. 9 is a similar view from the front in cross-section of an elliptical transition line on the front wing of the pressure side and shows the depression 48. FIG. 10 is another front view similar to FIG. 9. FIG. 11 is a rear view in cross section similar to the front view in FIG. 9 but showing the elliptical transition line extending under the beam.

As can be seen in FIG. 4, FIG. 5, FIG. 7 and FIG. 11, the transition zone 34 does extend from the junction J on the pressure side 24 of the airfoil to the line B8 under the beam. Accordingly, the transition zone extending under the beam extends to a location between the pressure side 24 of the airfoil and the pressure side 63 of the beam. Similarly, the transition zone ends at a location along the line B1 on the inwardly facing surface of the suction side region of the beam and between the suction side 26 of the airfoil and the suction side 64 of the beam.

In one embodiment as shown in FIG. 7A, the transition zone smoothly changes in the chordwise direction to a location rearward of the beam at which the surface of the transition zone at a particular transition line approximates a single radius of curvature such that the offset ratio of the transition zone rounded to the nearest hundredth is one (R=1.00) and the offset distance A of the transition line measured with respect to the shroud is approximately equal to the offset distance B of the transition zone measured with respect to the airfoil. In one particular embodiment, the approximation of the single radius of curvature for a particular transition line is formed such that the offset ratio of the transition zone rounded to the nearest hundredth lies in a range of ninety-eight one-hundredths to one-hundred-three one hundredths (0.98=R=1.03) and the offset distance A of the transition line measured with respect to the shroud is approximately equal to the offset distance B of the transition zone measured with respect to the airfoil.

As can be seen from these Figures, the transition zone over substantially all of its extent between the leading edge region and the trailing edge region extends to the sides of the wings such that each wing has a cross-sectional shape at a location along a normal sectioning plane that is spanwisely tapered to the sides of the wings, and that is spanwisely tapered under the beam at least as far as the immediately adjacent portion of the wing. In one particular embodiment, the transition lines in the transition zone that extended only under the wings covered over ninety-nine (99) percent of the surface area under the wings (that is, the flow path area under the wings) with the transition zone. In other embodiments, good results are expected where the transition lines extend to cover over ninety-five (95) percent of the wing area with the transition zone. As can be seen from the Table, the cross-sectional shape of the transition zone has more than one type of curvature to reduce stresses in the rotor blade as compared to transition zones having one type of curvature for the transition zone. For example, offset ratios equal to one provide circular transition lines which on the pressure side of the airfoil decreases surface stresses in the airfoil at the rear portion of the pressure side wing. Offset ratios greater than one provide elliptical shaped or true elliptical transition lines reduce stress concentration factors better than circular cross-sections. They are heavier constructions than analogous circular transition lines because more material is placed closer to the shroud at a greater radial distance from the axis Ar.

Figure 12:
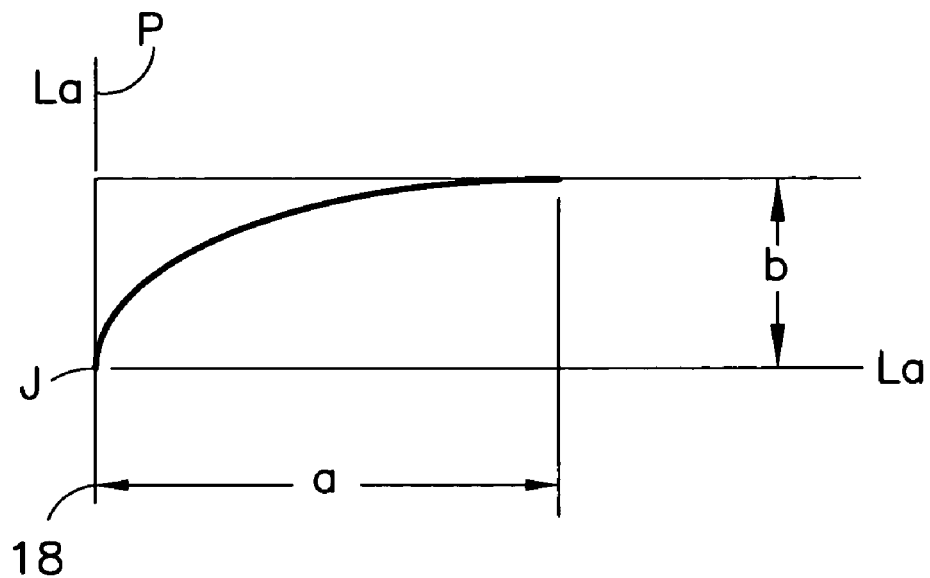
FIG. 12 and FIG. 13 are simple views respectively of a conical section curve and a two radius curve approximating the conical section curve.

Conical section lines that represent the intersection of a plane with a right circular cone form transition lines that have the advantageous benefits of reducing stress concentration factors. These curves may be used to form transition lines. Elliptical transition lines are one example. Another example are transition lines formed with curves of multiple radii that follow a conical section lines such as an elliptical transition line. These transition lines may be formed as shown in FIG. 12. These curves are used on at least one of said sides of the airfoil and show transition lines that extend under the beam that have greater bending away from the airfoil at a region closer to the airfoil on the transition line than at a region closer to the side of the shroud. As a result, and as shown in FIG. 7 and Table 1, the average of offset ratios Rb of transition lines that extend under the beam are greater than one and are greater than the average of offset ratios Rw of transition lines that extend only under the rear portion of wings. In fact, and embodiment shown, the absolute value of the transition lines Rb is greater than the ratios Rw.

Thus, the transition lines which define the contour of the flow path surface of the shroud for the transition zone of the wing and of the beam follow the shape of part of a conical section. They also have an offset ratio on the suction side of the airfoil for the beam Rb and for the forward portion of the wing Rw that is greater on average than the offset ratio on the pressure side of the airfoil for the beam Rb and for the rear portion of the wing Rw, thus providing a more elliptical flowpath surface on the suction side beam-wing forward region to reduce stress concentration factors in that region. They also provide a more circular flowpath surface on the pressure side for the beam-rear wing portion to provide transition zone material that extends down the airfoil, the offset distance B, for at least 80% of the length that the material extends laterally on the shroud, offset distance A, to reduce airfoil surface stresses as compared to an airfoil not having such a length of shroud material.

These are more easily manufactured because curves with constant radius or regions of constant radius are much easier to inspect. Thus, it is advantageous to transfer some loads from a region and to use circular curves (rear portions of wing) in those regions because the stress concentration factor is less of a concern. In regions where the stress concentration factor is of more concern, curves of multiple radii may be used to generate transition lines having a conical or almost conical curves. The advantage results because during manufacture, the transition line curves must be inspected and have a profile tolerance. In applying the tolerances, the minimum radial dimension should not be violated. However, when normal tolerances are applied in some locations on conical sections, it is difficult to determine if the curve has violated the minimum radius tolerance dimension. This is less severe and may be eliminated if a curved compound transition line is used. In those cases, the inspection criteria set out can control the radii sizes by applying a limit dimension to each of the radii.

Figure 13:
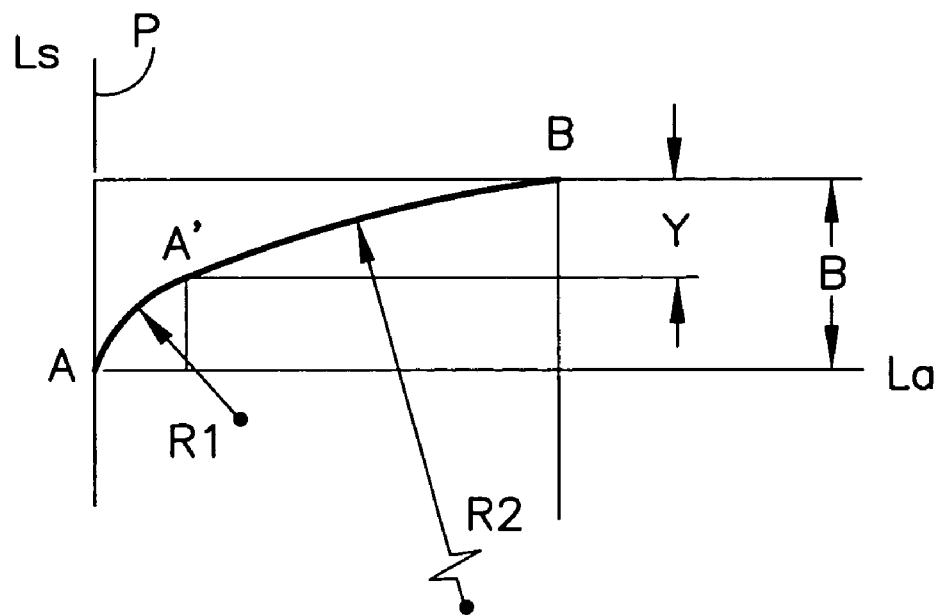

FIGS. 12 and 13 are examples of a conical transition line and a two radius curve fitted to a conical transition line. As will be realized, more than two curves could be used to generate the same transition line.

Although the invention has been shown and described with respect to detailed embodiments thereof, it should be understood by those skilled in the art that various changes in form and detail may be made without departing from the spirit and scope of the claimed invention.

We claim:

1. A rotor blade for a rotary machine having a flowpath for working medium gases, the rotor blade having an inner end which includes a base which adapts the rotor blade to be joined to a rotatable structure, an outer end having a laterally extending, outwardly facing surface which is disposed circumferentially about an axis Ar and having a radius of curvature about the axis Ar, an airfoil having a leading edge, a trailing edge, and a suction side and a pressure side which each extend chordwise from the leading edge to the trailing edge, and a tip region which includes the outer end, which comprises:

a plurality of airfoil sections disposed spanwise about and perpendicular to a stacking line for defining the surfaces of the airfoil, the stacking line of the airfoil extending spanwise in a radial direction, and each airfoil section having
a leading edge,
a trailing edge spaced chordwise from the section leading edge,
a suction side extending from the section leading edge to the section trailing edge, and
a pressure side extending from the section leading edge to the section trailing edge;
a tip shroud for the rotor blade disposed in the tip region, the tip shroud including wings which extend from the sides of the airfoil, the wings including a pressure side wing extending from the pressure side of the airfoil having a front portion and a rear portion, having a laterally facing pressure side, and having a portion of a transition zone which extends from the pressure side of the airfoil, a suction side wing that extends from the suction side of the airfoil having a front portion and a rear portion, having a laterally facing suction side, and having a portion of a transition zone which extends from the suction side of the airfoil, a beam integral with the wings which extends laterally between the wings to divide each wing into the front portion and the rear portion, the beam further having a pressure side region extending laterally past the pressure side of the airfoil in the tip region of the airfoil, having a laterally facing pressure side which adapts the beam to engage a suction side of a beam of an adjacent airfoil, and having an inwardly facing surface which extends to the pressure side of the beam, a portion of a transition zone which extends from the pressure side of the airfoil, a suction side region extending laterally past the suction side of the airfoil in the tip region of the airfoil, having a laterally facing suction side which adapts the suction side of the beam to engage a pressure side of the beam of the adjacent airfoil, and having an inwardly facing surface which extends to the pressure side of the beam, a portion of a transition zone which extends from the suction side of the airfoil, a seal land extending radially outwardly from the beam, the seal land extending past the sides of the airfoil between the front and rear portions of the suction side wing and the pressure side wing and having said outwardly facing surface which extends circumferentially with respect the axis Ar and which adapts the seal land to block the leakage of working medium gases past the tip region of the rotor blade; and a transition zone formed from said transition zone portions of the wings and of the beam, the transition zone extending from a junction with the suction side of the airfoil and a junction with the pressure side of the airfoil to provide a flow path surface of the shroud which has a smooth contour;

wherein the rotor blade has a reference normal sectioning plane P passing through a point at the junction of the transition zone to the airfoil that contains a first line perpendicular to the side of the airfoil section at that junction point and a second line passing through that junction point that is perpendicular to the first line and parallel to the stacking line of the airfoil;

wherein a transition line is the line of intersection of the plane P with the transition zone at a junction point and defines the surface contour of the transition zone at a particular location;

wherein each transition line has an offset distance A from the airfoil which is the distance of the projection of the transition line along the first line of the plane P perpendicular to the side of the airfoil section, has an offset distance B from the shroud which is the distance of the projection of the transition line along the second line of the sectioning plane parallel to the stacking line, and has an offset ratio which is the ratio of the offset distance A from the airfoil divided by the offset distance B from the shroud;

wherein each transition line has a first end at the junction point and a second end at the point the transition zone terminates, the transition lines being smoothly recessed from a straight line connecting the ends of each transition line; wherein on at least one of said sides of the airfoil those transition lines that extend under the beam have greater bending away from the airfoil at a region closer to the airfoil on the transition line than at a region closer to the side of the shroud such that the average of offset ratios Rb of transition lines that extend under the beam are greater than one and are greater than the average of offset ratios Rw of transition lines that extend only under the rear portion of the wings.

2. The invention as claimed in claim 1 wherein the offset ratios Rb of transition lines extending under the beam are greater than the offset ratios Rw of transition lines extending only under the rear portions of the wings.

3. The invention as claimed in claim 1 wherein the transition lines extending under the beam appear to be formed by part of a conical section but approximate the conical section with multiple radii of curvature.

4. The invention as claimed in claim 1, wherein the transition lines extending under the beam have a first radius of curvature adjacent the airfoil and a second radius of curvature adjacent the shroud that is larger than the first radius of curvature.

5. The invention as claimed in claim 4 wherein the first and second radii of curvature each intersect at a point of tangency with the transition line.

6. The invention as claimed in claim 5, wherein the intersection includes a straight line that is tangent to the first and second radii of curvature.

7. The invention as claimed in claim 5, wherein the intersection includes a curved line that is tangent to the first and second radii of curvature.

8. The invention as claimed in claim 5 wherein, the first and second radii of curvature each intersect each other at a point of tangency.

9. The invention as claimed in claim 1, wherein the transition zone smoothly changes in the chordwise direction to a location rearward of the beam at which the surface of the transition zone at a particular transition line approximates a single radius of curvature such that the offset ratio of the transition zone rounded to the nearest hundredth lies in a range of ninety-eight one-hundredths to one-hundred-three one hundredths (0.98=R=1.03) and the offset distance A of the transition line measured with respect to the shroud is approximately equal to the offset distance B of the transition zone measured with respect to the airfoil.

10. The invention as claimed in claim 1, wherein the transition zone smoothly changes in the chordwise direction to a location rearward of the beam at which the surface of the transition zone at a particular transition line is a single radius of curvature such that the offset ratio of the transition zone rounded to the nearest hundredth is one (R=1.00) and the offset distance A of the transition line measured with respect to the shroud is approximately equal to the offset distance B of the transition zone measured with respect to the airfoil.

11. The invention as claimed in claim 1, wherein the offset distances of the transition line in portions of the transition zone forward or rearward of the beam are smaller than the distances measured at a location under the beam.

12. The invention as claimed in claim 1 wherein the transition lines extending under the beam are part of a conical section.

13. The invention as claimed in claim 12 wherein the transition lines extending under the beam have multiple radii of curvature.

14. The invention as claimed in claim 12, wherein the transition lines extending under the beam have a first radius of curvature adjacent the airfoil and a second radius of curvature adjacent the shroud that is larger than the first radius of curvature.

15. The invention as claimed in claim 12 wherein the transition lines extending under the beam are part of an elliptical conical section.

16. The invention as claimed in claim 15 wherein the transition lines extending under the beam have multiple radii of curvature.

\* \* \* \* \*